P. LANHAM.
RECORDING METER.
APPLICATION FILED MAR. 11, 1919.

1,334,912.

Patented Mar. 23, 1920.
3 SHEETS—SHEET 1.

Inventor
Paul Lanham
By Chas. J. O'Neill
Attorney

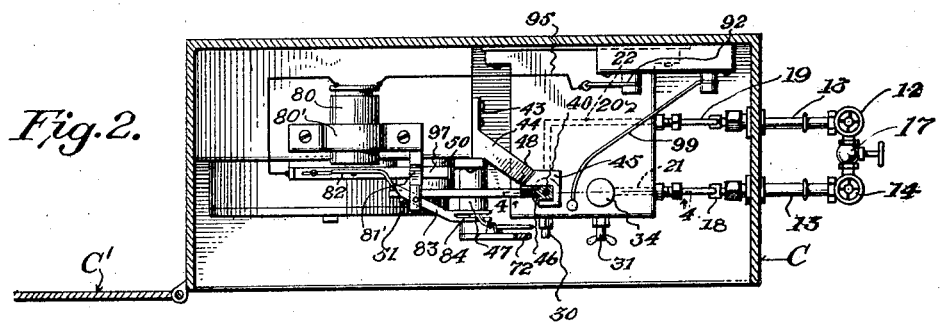

P. LANHAM.
RECORDING METER.
APPLICATION FILED MAR. 11, 1919.
1,334,912.
Patented Mar. 23, 1920.
3 SHEETS—SHEET 3.
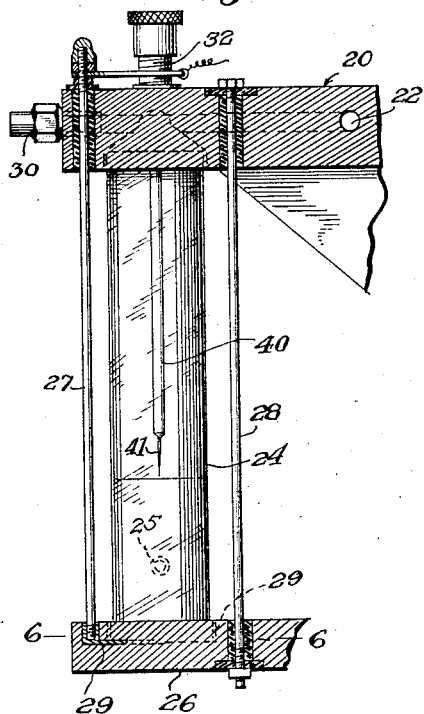
Fig. 5.
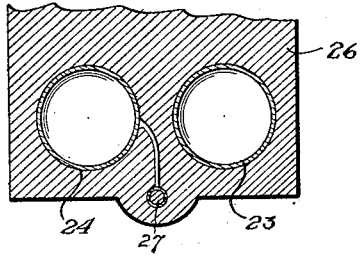
Fig. 6.
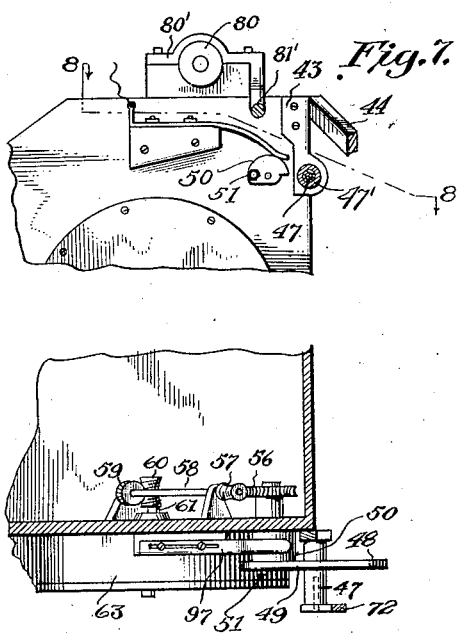
Fig. 7.
Fig. 9.
Fig. 8.
Inventor
Paul Lanham
by Chas. J. O'Neill
Attorney

UNITED STATES PATENT OFFICE.

PAUL LANHAM, OF LANHAM, MARYLAND.

RECORDING-METER.

1,334,912.  Specification of Letters Patent.  Patented Mar. 23, 1920.

Application filed March 11, 1919. Serial No. 282,004.

*To all whom it may concern:*

Be it known that I, PAUL LANHAM, a citizen of the United States, residing at Lanham, county of Prince Georges, State of Maryland, have invented certain new and useful Improvements in Recording-Meters; and I do hereby declare the following to be a full, clear, and exact description of the invention, such as will enable others skilled in the art to which it appertains to make and use the same.

The invention relates to certain improvements in recording meters of the general type described in my prior Patent, No. 1,075,427, dated October 14, 1913, and has for its object to provide an instrument of this general character capable of a wide range of use in measuring forces, such as pressures, velocities, hydrostatic heads and the like, and to reduce the same to definite record form, the several elements of the apparatus being so coördinated as to permit the latter to be readily applied to its intended use, to be quickly and accurately adjusted and to produce permanent, uniform records that are free from material error.

The preferred form of the invention is illustrated in the accompanying drawings, in which, Figure 1 is a front elevation, partly in section, of the apparatus as applied to measuring and recording the changes of velocity of flow of fluid in a pipe.

Fig. 2 is a horizontal section on line 2—2 of Fig. 1.

Fig. 3 is a vertical section on line 3—3 of Fig. 1.

Fig. 4 is an enlarged vertical section through the U-tube or fluid column apparatus.

Fig. 5 is a sectional elevation taken at right angles to the view in Fig. 1.

Fig. 6 is a horizontal section on the line 6—6 of Fig. 5.

Fig. 7 is an elevation, partly in section, of certain of the mechanical parts.

Fig. 8 is a horizontal section on line 8—8 of Fig. 7.

Fig. 9 is an enlarged sectional elevation illustrating certain of the operating mechanism.

Figures 1, 10:
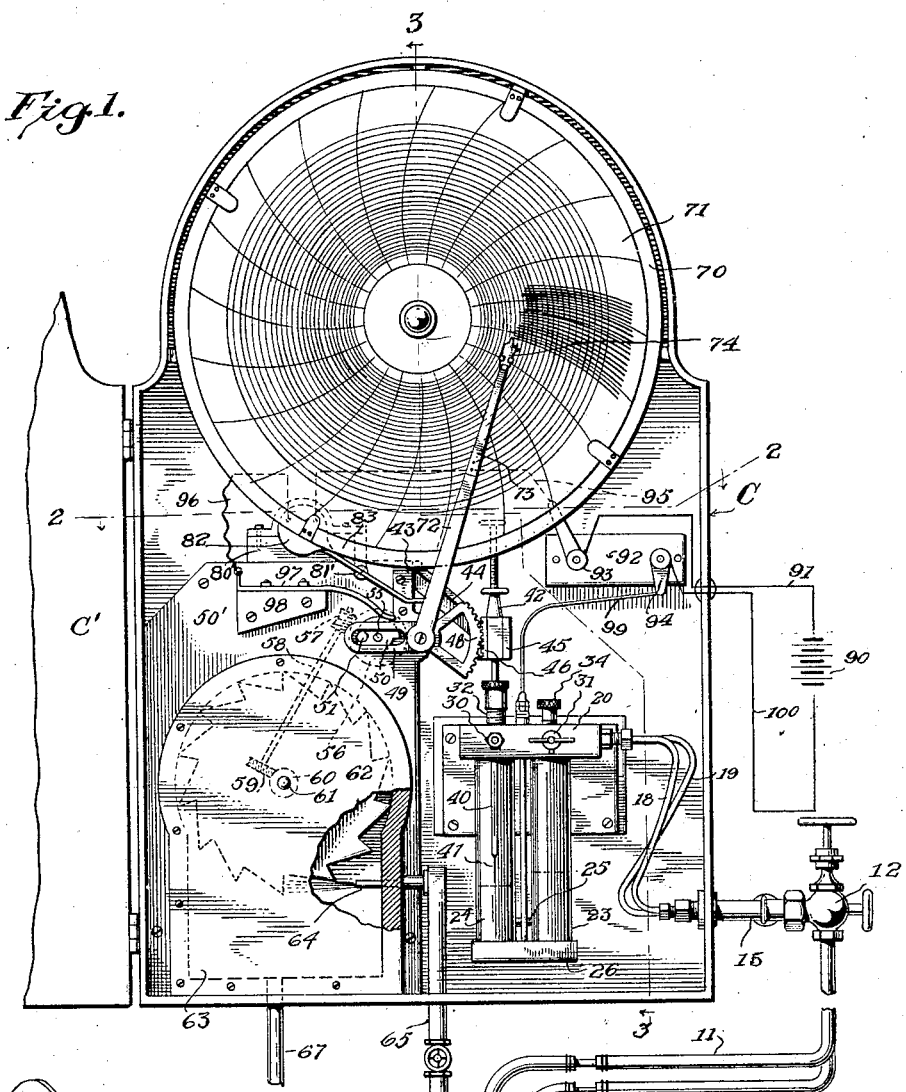
Fig. 10 is a perspective view of the armature lever for operating the stylus of the recorder.

Referring to the drawings, which are exemplary of the preferred form of the apparatus, 1 indicates a valved tap connection adapted to be secured to the main or pipe conducting the medium whose flow or velocity is to be measured, said connection including a packing box or gland 2 provided with a clamping ring 4 at its top to receive and permanently hold tubular sheathing 3 of a Pitot tube device, involving two small tubular members 5 and 6 which terminate in a unitary head at their lower portions, provided with an impact orifice 7 in communication with tube 5 and reference orifices 8 and 9 communicating with tube 6. Said Pitot tube members 5 and 6 are connected respectively by pipes 10 and 11 with permanent pipe sections 13 and 15 respectively, which include suitable needle valves 12 and 14. Pipes 13 and 15 are connected by a suitable by-pass 16 controlled by a valve 17. The pipe sections 13 and 15 are supported in the side wall of a casing C, which incloses the measuring and recording apparatus, and which is provided with a hinged cover C' having a sight opening with a glass or similar transparent closure to permit observation of the chart, upon which the record is made.

Mounted on the rear wall of the casing C is a bracket 20 which supports the manometer or U-tube device by means of which the differential forces or pressures are manifested by the differences in the levels of the fluid columns in the respective legs of the U-tube. Said manometer comprises two vertical glass tubes 23 and 24, which are connected at a point some distance above their lower ends by a cross pipe or conduit 25, each of said tubes being closed at its lower end by a cupped washer 29 mounted in a plate 26 which is suspended from the bracket 20 by means of tie rods 27 and 28. The upper ends of the tubes 23 and 24 fit into recesses in the underface of the bracket member 20, which latter is provided with channels or conduits 21 and 22, which communicate with the interiors of the tubular members 23 and 24 respectively, and also terminate in the front end of the bracket member 20 in discharge orifices provided with pet-cocks 30 and 31, which admit of either of the tubular members 23 and 24 being opened to the atmosphere under certain conditions. The tie rods 27 and 28, where they pass through the bracket 20, are insulated from said bracket by suitable sleeves and washers, as indicated in Fig. 5. The conduits 21 and 22 are connected with the pipes 13 and 15 respectively by means of flexible pipe sections 18 and 19, so that the effective differential pressures manifested at the impact and reference orifices of the Pitot tube will be transmitted to the respective legs 24 and 23 of the U-tube and produce a corresponding variation in the height of the mercury columns in the respective tubes.

The bracket 20 is provided with a nipple 33 having a screw cap 34, which nipple gives access to the interior of the leg 23 of the U-tube. Mounted on the bracket 20 in axial alinement with the member 24 of the U-tube is a gland or stuffing box 32 through which passes a rod 40 having on its lower end a sharp needle of platinum or other suitable metal 41, which is adapted to be moved into and out of contact with the mercury in the leg 24, when the rod 40 is reciprocated. The upper end of the rod is provided with screw threads, which engage the interior screw-threaded opening in a block-like member 46 provided with rack teeth on one face, which member is guided in the slotted end 45 of an arm 44 forming part of a bracket 43 secured to a suitable support in the casing C. The said rod or spindle 40 is also provided with a lock nut 42 to maintain the same and the rack associated therewith in proper adjusted position, the adjustment being effected by means of the knurled head on the upper end of the rod.

Coöperating with the rack 46 is a toothed sector 48 which is pivotally supported on a stud 47 mounted in brackets 43, as more particularly illustrated in Fig. 7, the sector having a hub-like member 47′ to afford a relatively long bearing for the sector on the stud. The opposite end of the sector is provided with a slotted opening 49 which is engaged by a crank pin 51 mounted upon a rotary cam 50 connected to the end of a stub shaft 55, journaled in the front wall of a supporting casing 50′, mounted in the main casing C, said shaft having on its rear end a worm wheel 56. Rotation of the shaft 55 produces a uniform oscillatory rotation of the sector 48 and a correspondingly uniform reciprocation of the rod 40 which causes the platinum needle contact on the end of said rod to pass into and out of engagement with the mercury or other fluid in the leg 24 of the U-tube.

A suitable motor is provided for imparting the movements aforesaid to the sector and contact rod, and in the present instance, in which the apparatus is designed particularly to measure the flow of liquid in pipes or conduits, said motor takes the form of a relatively high speed fluid impact rotary motor mounted in the casing 63 provided with a discharge 67, and comprising a disk-like rotor 62 having peripheral vanes or buckets interposed in the path of a fluid jet delivered by an inlet nozzle 64, connected by a valved pipe 65 to the sheath 2 of the coupling 1, which is open to the fluid pressure in the main or pipe M, as illustrated in Fig. 1. The rotor 62 is provided with a central shaft 61 journaled in the walls of the casing 63 and having on its inner end a worm 60 meshing with a worm wheel 59 on a shaft 58, said shaft being journaled on the rear face of the motor casing and carrying at its upper end the worm 57 which drives worm wheel 56. It will be observed that this train of reducing gearing transmits the relatively high rotary speed of the motor to the sector 48 in the form of comparatively slow oscillations, so that even though the speed of the motor varies within reasonable limits, the changes in speed will not be appreciably manifested in the oscillations of the sector and the reciprocations of the rod 40, but said rod will be caused to reciprocate at a substantially slow, uniform rate.

Secured in the upper portion of the casing C is a stationary recorder disk 70 provided with a central opening through which projects a stud or spindle 70′ of a clock mechanism 70″, which spindle has on its outer end a shoulder 71′ registering with the central opening in the disk 70 and a cap nut 71″, adapted to clamp a disk-like record chart 71 to the spindle, so that said chart is slowly revolved against the face of the disk 70 by the spindle 70′, as is usual in recorders of this general type. If found necessary, the disk may be provided with suitable spring clips or guides which overlie the peripheral edge of the chart and cause the chart to lie flat against the disk.

Coöperating with the chart is a suitable stylus or marking device, which in the present form comprises an arm 72 mounted on the central hub of the sector 48 and therefore participating in the oscillatory movement of the sector. The forward end of said arm is provided with a spring member 73 to the outer end of which is secured a capillary pen 74 carrying a proper supply of ink, the spring 73 tending normally to lift the pen from the chart, and hold the same in retracted position. In order to insure the separation of the pen from the chart when no record is being made, a light spring 76 secured to the under face of the arm 72 is provided with a downwardly bent front portion which engages the face of the chart and tends to elevate the pen end of the arm. Pivoted at 77 to the under side of the arm 72 is a lever 75 which engages at its outer end with the spring 73 carrying the capillary pen, which lever serves to move the pen into contact with the chart.

The lower end of the lever 75 is bent downward and has an angular projection which is adapted to be engaged by the bifurcated end 84 of an armature lever 83 journaled in a slotted stud 81', on a bracket arm 81, carried by a support 80' on the upper part of the casing 50'. The upper end of the lever 83 is provided with a disk armature 82 which coöperates with an electromagnet 80 carried by the support 80' aforesaid. When the armature 82 is attracted by the magnet 80, the pen is moved into contact with the chart and traces an arcuate record line on the chart, the length of which is determined by the length of time the magnet is energized, which latter is dependent upon the period of time which elapses between the engagement of the contact 41 with the mercury in leg 24 of the U-tube and the breaking of the circuit at cam 50 and brush 97. To effect this series of operations, the electromagnet is included in a circuit comprising a battery 90, a lead 91 connected to a terminal 93 on a contact block 92 secured to the rear wall of the casing C, from which terminal a lead 95 is connected to one end of the wire coil of the magnet 80, the other end of said coil being connected by a lead 96 to a stationary spring contact or brush 97 mounted on a block 98 attached to the face of the casing 50'. The outer end of the spring contact 97 coöperates with the rotary cam 50, which is included in the gearing between the motor and the oscillatory sector, the contact face of said cam 50 being so proportioned as to pass out of engagement with the spring contact 97 when the pen arm 72 reaches the outer limit of its oscillatory movement, thereby deënergizing the magnet and permitting the pen to be lifted from the paper. The electric circuit is continued through the cam 50 sector 48, rack 46, contact rod 40, contact wire 41, the mercury in the U-tube, closure plate 29 at the bottom of the leg 24 of the U-tube, thence to tie rod 27, lead 99 to terminal 94 on the contact block 92 and thence by lead 100, back to the battery.

In applying the apparatus to the measurement and recording of the rate of flow of a fluid in a pipe or conduit and the variations in the rate aforesaid, the apparatus is connected up to the conduit in the manner shown in Fig. 1. The particular form and construction of the Pitot tube and its accessories admits of the Pitot tube being readily applied and adjusted to proper position through the valved coupling 1 and the inclosing sheath 2 associated therewith, a tight joint being effected between the Pitot tube casing 3 and the packing box 2 by means of a clamping collar 4, this particular arrangement admitting of the tube being inserted, removed and adjusted with facility and insuring a water tight joint where the casing 3 passes through the packing box 2 of the coupling. After the Pitot tube has been properly adjusted to the main, the apparatus is adjusted to zero position by closing one of the valves 12 or 14 and opening the by-pass 17 which equalizes the fluid pressure of the two sides of the mercury column of the U-tube so that the mercury stands at the same level in both legs of the U-tube. The rod 40 is then adjusted so that the extreme point of the platinum wire contact 41 just touches the surface of the mercury and the pen 74 is brought to the zero line of the chart 71. This may be effected by turning the rod 40 and thereby raising or lowering the rack 46 carried thereby until the point of the pen rests upon the zero line of the chart after which the said nut 42 is turned up to clamp the rod and rack in its adjusted position. The by-pass valve 17 is then closed and both of the needle valves 12 and 14 opened. The water from the main flows into the respective legs of the U-tube through the connecting conduits and forces the mercury down in leg 24 and up in leg 23, the differences in level of the mercury column in the respective legs accurately corresponding to the differences in fluid pressure at the impact orifice 7 and the reference orifice 8 of the Pitot tube, as will be understood. Fluid pressure is then admitted to the rotary motor by way of pipe 65 and the rotor of said motor is caused to rotate at high speed, which is transmitted by the reducing gearing connecting the motor and the sector 48 and is manifested by a slow oscillatory movement of the sector which in turn produces correspondingly slow and uniform reciprocation of the rod 40, which moves the platinum contact wire 41 into and out of the mercury column in leg 24 of the U-tube. The oscillation of the sector also produces a corresponding oscillation of the stylus arm 72 and causes the pen 70 to traverse an arcuate path back and forth across the face of the record chart from the zero line on the chart to the outer limit of the record space. The pen, however, is maintained out of contact with the chart until the magnet 80 is energized and this latter effect is produced when the circuit from the battery 90 is completed through the magnet, which is effected the instant the tip of the contact 41 engages the surface of the mercury in leg 24 of the U-tube. The energization of the magnet 80 causes the armature 82 to be attracted, which rocks the lever 83 and causes the outer forked end of said lever to swing lever 75 on its pivot and depress the outer spring-end of the pen or stylus arm 72 and bring the point of the pen into engagement with the chart, so that the pen begins the trace or record line as soon as the contact 41 engages the mercury column. This circuit is maintained closed until the pen arm has swung to its extreme outer limit, at which time the circuit is broken by the cam 50 and passing out of engagement with the contact spring 97, which is interpolated in the circuit. This interruption of the magnet circuit releases the armature and permits the spring on the end of the pen arm to lift the pen away from the chart so that no record is made on the return movement of the pen arm. It will be particularly noted that the record lines or markings produced on the chart by the pen are initiated each time the contact 41 engages the surface of the mercury column in leg 24 and as the said mercury column falls or rises in consonance with the increase or decrease in the velocity of the fluid in the pipe, the corresponding record line traced by the pen will begin later or earlier in the outward movements of the pen so that when the record is complete, the chart will show a series of arcuate record lines, each one representing a separate oscillation of the pen, so that a continuous line intersecting the extreme inner ends of the traces or record lines will indicate the variations in the rate of flow of the fluid in the conduit M throughout the entire period of operation of the apparatus, as represented by the time intervals on the chart.

It is found of advantage to connect the battery so that the current flows from the contact 41 to the mercury and not in the reverse direction, as this tends to maintain a clear bright surface on the mercury column which insures an instantaneous closure of the current when the contact engages the surface of the mercury. When the current is reversed and flows from the mercury to the contact, it is found that the surface of the mercury tends to foul and the accuracy of the instrument is correspondingly impaired.

The provision of the pet-cocks at the tops of the U-tube legs permits any foreign material or reaction products to be blown out of the U-tube, which can be effected by cutting off the pressure from one of the legs of the U-tube and opening the corresponding pet-cock, which will force all of the mercury above the cross connection 25 into the corresponding leg of the U-tube, the mercury carrying with it any entrapped impurities which will rise through the mercury and be carried out with the supernatant water through the pet-cock. The particular construction of the U-tube illustrated, involving two stout glass tubular sections, connected at a point above their lower ends by an integral cross pipe 25 and closed at their upper and lower ends by packed joints formed in the bracket 20 and the plate 26 respectively insures a very strong and efficient apparatus, which is capable of resisting extremely heavy pressures and which is not subject to the derangements and errors common to the ordinary form of continuous U-tube.

What I claim is:—

1. A meter comprising a fluid column variable with the force to be measured, a reciprocating contact coöperating with said column, an electric circuit made and broken by the engagement and disengagement of said contact and column, a motor, gearing connecting the motor and contact to reciprocate the latter, a moving record chart, a stylus coöperating with said chart, connections between said gearing and the stylus to oscillate the latter through a fixed path, means to move the stylus to recording relation to the chart when the circuit aforesaid is closed, and means to break said circuit when the stylus reaches the outer limit of its movement.

2. A meter comprising a fluid column variable with the force to be measured, a reciprocating contact coöperating with said column, an electric circuit made and broken by the engagement and disengagement of said contact and column, a motor, gearing connecting the motor and contact to reciprocate the latter, a moving record chart, a stylus coöperating with said chart, connections between said gearing and the stylus to oscillate the latter through a fixed path, an electromagnet having an armature adapted to move the stylus to recording relation to the chart when the circuit aforesaid is closed, and means to break said circuit when the stylus reaches the outer limit of its movement.

3. A meter comprising a fluid column variable with the force to be measured, a reciprocating contact coöperating with said column, an electric circuit made and broken by the engagement and disengagement of said contact and column, a motor, gearing including an oscillating sector connecting the motor and contact to reciprocate the latter, a moving record chart, a stylus secured to said sector and coöperating with said chart, means to move the stylus to recording relation to the chart when the circuit aforesaid is closed, and means to break said circuit when the stylus reaches the outer limit of its movement.

4. A meter comprising a fluid column variable with the force to be measured, a reciprocating contact coöperating with said column, an electric circuit made and broken by the engagement and disengagement of said contact and column, a motor, gearing including an oscillating sector connecting the motor and contact to reciprocate the latter, a moving record chart, a stylus secured to said sector and coöperating with said chart, an electromagnet having an armature adapted to move the stylus to recording relation to the chart when the circuit aforesaid is closed, and means to break said circuit when the stylus reaches the outer limit of its movement.

5. A meter comprising a fluid column variable with the force to be measured, a reciprocating contact coöperating with said column, an electric circuit made and broken by the engagement and disengagement of said contact and column, a rotary motor, reducing gearing including an oscillating sector connecting the motor and contact to reciprocate the latter, a moving record chart, a stylus coöperating with said chart, connections between said gearing and the stylus to oscillate the latter through a fixed path, means to move the stylus to recording relation to the chart when the circuit aforesaid is closed, and means to break said circuit when the stylus reaches the outer limit of its movement.

6. A meter comprising a fluid column variable with the force to be measured, a reciprocating contact coöperating with said column, an electric circuit made and broken by the engagement and disengagement of said contact and column, a motor, gearing connecting the motor and contact to reciprocate the latter, a moving record chart, a stylus coöperating with said chart, connections between said gearing and the stylus to oscillate the latter through a fixed path, means to move the stylus to recording relation to the chart when the circuit aforesaid is closed, and means to break said circuit when the stylus reaches the outer limit of its movement, said means including a rotary cam associated with said gearing and a coöperating spring contact.

7. In a recording meter including a moving chart and an oscillatory stylus, the combination of a fluid column variable with the force to be measured, a reciprocatory rod carrying a contact moved into and out of the fluid column, a rack on said rod, an oscillating sector engaging said rack and carrying said stylus, and means for imparting oscillatory movement to said sector.

8. In a recording meter including a moving chart and an oscillatory stylus, the combination of a fluid column variable with the force to be measured, a reciprocatory rod carrying a contact moved into and out of the fluid column, a rack on said rod, an oscillating sector engaging said rack and carrying the said stylus, means for adjusting said rod and stylus to zero positions, and means for imparting oscillatory movement to said sector.

9. In a recording meter including a moving chart and an oscillatory stylus, the combination of a fluid column variable with the force to be measured, a reciprocatory rod carrying a contact moved into and out of the fluid column, a rack on said rod, an oscillating sector engaging said rack and carrying the said stylus, a screw-threaded connection between the rod and rack to permit the adjustment of the elements to zero position, and means for imparting oscillatory movement to said sector.

10. In a recording meter including a moving chart and an oscillatory stylus, the combination of a fluid column variable with the force to be measured, a reciprocatory rod carrying a contact moved into and out of the fluid column, a rack on said rod, an oscillating sector engaging said rack and carrying the said stylus, means for imparting oscillatory movement to said sector, an electric circuit including electromagnetic means for engaging the stylus with the chart when the circuit is closed between the contact and fluid column, and means for breaking the circuit when the stylus reaches the outer limit of its movement.

In testimony whereof I affix my signature.

PAUL LANHAM.